(No Model.)

W. L. McCAREL.
PROCESS OF CURING CLAY PRODUCTS.

No. 568,266.　　　　　　　Patented Sept. 22, 1896.

WITNESSES:
H. D. Nealy.
J. A. Walsh.

INVENTOR
William L. McCarel
BY
Chester Bradford,
ATTORNEY.

THE NORRIS PETERS CO., PHOTO-LITHO., WASHINGTON, D. C.

UNITED STATES PATENT OFFICE.

WILLIAM L. McCAREL, OF BRAZIL, INDIANA, ASSIGNOR OF ONE-HALF TO JOSEPH V. AYER, OF SAME PLACE.

PROCESS OF CURING CLAY PRODUCTS.

SPECIFICATION forming part of Letters Patent No. 568,266, dated September 22, 1896.

Application filed April 24, 1896. Serial No. 588,886. (No specimens.)

*To all whom it may concern:*

Be it known that I, WILLIAM L. MCCAREL, a citizen of the United States, residing at Brazil, in the county of Clay and State of Indiana, have invented certain new and useful Improvements in Processes of Curing Clay Products, of which the following is a specification.

As is well known, clay structures shrink largely in drying. It is due to this fact that heretofore such structures as hollow tile have been necessarily made in comparatively short lengths, as, under the methods heretofore in use, if the green tile are cut in long lengths they will, if in recumbent position, break or crack during the drying process; or if placed in upright position they will become bent or distorted.

It is of great importance in many classes of work that the sections be as long as possible. For example, when such hollow clay tile or structures are used as conduits for electric wires (in which the joints must be made watertight) a multiplication of the joints involves materially larger expense.

The object of my invention is to produce tile or hollow clay structures in long lengths and without warping, breaking, or cracking. This process involves the use of a support having a movable surface, and in which the several parts of the surface shall be movable in relation to each other, and such a positioning of the support that the weight of the tile will cause it to travel toward one end as fast as the shrinking proceeds without any strain on the structure.

One means of carrying out my improved process or method is illustrated in the accompanying drawings, in which—

Figure 1:
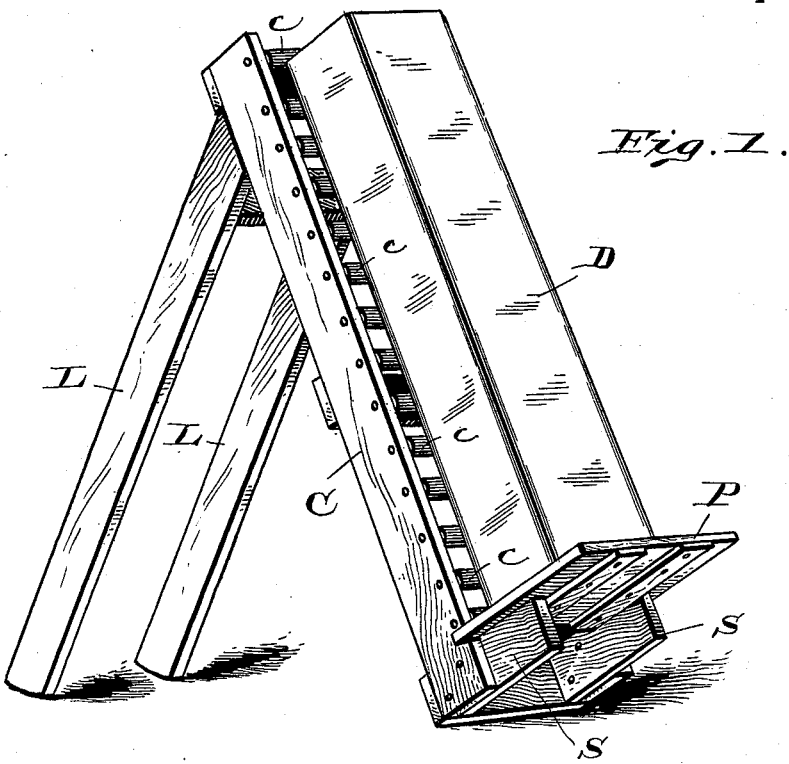
Figure 2:
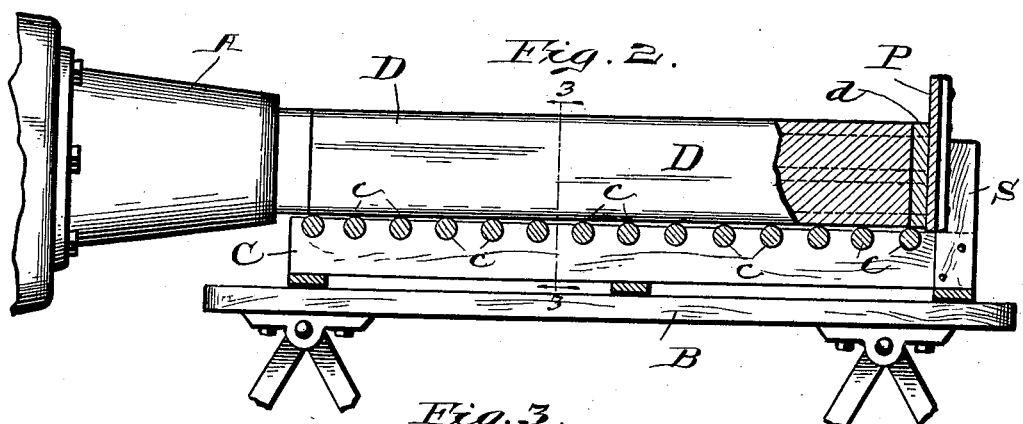
Figure 3:
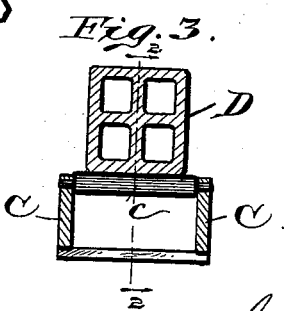

Figure 1 is a perspective view of a support and a tile thereon in position as when the drying process is in progress; Fig. 2, a longitudinal sectional view illustrating the support in its relation to the nozzle of the tile-machine while receiving the green tile therefrom, and Fig. 3 a transverse sectional view of said tile-support.

In said drawings the portions marked A represent the nozzle of a tile-machine; B, a table positioned in front of said nozzle; C, the frame of the tile-support, and D the tile.

The tile-mill with its nozzle A and the accompanying table B all are or may be of any usual or desired form, and as they form no part of my present invention, being shown merely for purposes of illustration, will not be further described herein, except incidentally in describing the invention.

The frame C is a plain rectangular frame, and the surface which receives the tile is composed of numerous rollers *c*, which are mounted to revolve loosely in suitable bearings in the sides of said frame. This support is first placed on the table B, in front of the clay-machine, and receives the tile or other product from the nozzle A of said machine, as shown in Fig. 2. When a sufficient length has been run out, it is squared off at each end, the support carrying the tile removed, and a pallet or board P having been first put in place the support is raised up to an angle, as illustrated in Fig. 1, where it may be held by suitable legs L or any other desired structure. Standards S form a secure backing-support for the pallet P. The end surface of the tile structure, which comes in immediate contact with the pallet, is apt to adhere thereto somewhat in drying, and the shrinking sidewise therefore has a tendency to check or split said end. To obviate this, I cut off a short section *d* at said end, and after properly finishing the end of the principal structure insert this small piece between it and the pallet, and this I have found by experience completely obviates the difficulty last-above spoken of.

The work in carrying out my process proceeds as follows: The tile is run out from the machine to something more than the required length, and the machine stopped. The end of the tile is then squared off, and the piece *d* cut off at the same time, and the tile as a whole is severed from the column of clay issuing from the machine, as indicated in the drawings. The support carrying the clay structure is then removed from in front of the tile-machine and set on trestles or some other suitable place, the short section *d* is taken out, the ends of the structure properly finished, the section *d* reinserted, and the structure moved endwise until said short section is impinged between its end and the pallet. The support carrying the structure is then raised to the position shown in Fig. 1, where it remains until dried to the required degree.

It is obvious, when the tile is supported in the manner and in the position illustrated by Fig. 1, that as it dries and shrinks the resultant travel will be constantly toward the lower end, and the integrity of the structure thus preserved. When it is remembered that green tiles will shrink approximately one-twelfth of their length in drying, it will be seen that if the tile was placed flat or in horizontal position it would, before being sufficiently dried to acquire strength, pull apart in shrinking, and thus make breaks or cracks therein, and if stood on end its strength is not sufficient, until it is partially dried, to hold it in proper shape, but it will bend or warp and become distorted.

By my invention I have secured both uniformity of structure and any desired length of product, and have thus greatly increased the value of such product, for the reasons hereinbefore indicated.

Having thus fully described my said invention, what I claim as new, and desire to secure by Letters Patent, is—

1. That process of curing tile or similar clay structures which consists in placing said structure in a position inclined in the direction of its length on a movable carrying-surface and leaving it to dry and shrink, substantially as set forth.

2. That process of curing clay products which consists in discharging the same onto a support, then severing the same from the column of clay issuing from the machine, forming a short section of green clay, introducing a supporting-pallet, interposing said short section of clay between the main clay structure and the pallet, and raising the whole to an inclined position, where the same remains until dried to the required degree.

3. A method of curing clay structures which embodies as a feature thereof the interposing of a short section of green clay between the clay structure being cured and the pallet or support against which the end thereof rests.

4. A method of curing green-clay structures which embodies a support having a yielding carrying-surface which receives the side of said green-clay structure, and a short section of green clay interposed between the end of said green-clay structure and the support therefor, substantially as set forth.

In witness whereof I have hereunto set my hand and seal, at Brazil, Indiana, this 21st day of April, A. D. 1896.

WILLIAM L. McCAREL. [L. S.]

Witnesses:
JOSEPH V. AYER,
JNO. M. TURNER.